United States Patent
Nissel

(10) Patent No.: US 6,863,517 B2
(45) Date of Patent: Mar. 8, 2005

(54) APPARATUS AND METHOD FOR MEASURING AND OF CONTROLLING THE GAP BETWEEN POLYMER SHEET COOLING ROLLS

(75) Inventor: Frank R. Nissel, Ambler, PA (US)

(73) Assignee: Welex Incorporated, Blue Bell, PA (US)

( * ) Notice: Subject to any disclaimer, the term of this patent is extended or adjusted under 35 U.S.C. 154(b) by 289 days.

(21) Appl. No.: 10/068,597

(22) Filed: Feb. 6, 2002

(65) Prior Publication Data

US 2002/0070478 A1 Jun. 13, 2002

Related U.S. Application Data

(63) Continuation-in-part of application No. 09/422,483, filed on Oct. 21, 1999, now Pat. No. 6,406,285.

(51) Int. Cl.7 .............................................. B29C 47/16
(52) U.S. Cl. ........................ 425/141; 425/150; 425/367
(58) Field of Search ................................ 425/141, 150, 425/172, 367, 327

(56) References Cited

U.S. PATENT DOCUMENTS

| | | |
|---|---|---|
| 3,358,485 A | 12/1967 | De Caro et al. |
| 3,809,907 A | 5/1974 | Schuller et al. |
| 3,883,704 A | 5/1975 | Barney |
| 3,918,865 A | 11/1975 | Nissel |
| 3,940,221 A | 2/1976 | Nissel |
| 3,959,431 A | 5/1976 | Nissel |
| 4,248,072 A | 2/1981 | Hasegawa et al. |
| 4,533,510 A | 8/1985 | Nissel |
| 4,678,023 A | 7/1987 | Knapp et al. |
| 4,691,547 A | 9/1987 | Teoh et al. |
| 4,821,544 A | 4/1989 | Tamler et al. |
| 4,979,556 A | 12/1990 | Braun et al. |
| 5,466,403 A | 11/1995 | Nissel |
| 5,533,371 A | 7/1996 | Frischknecht et al. |
| 5,671,625 A | 9/1997 | Barbe et al. |
| 6,406,285 B1 * | 6/2002 | Nissel ........................ 425/141 |
| 2002/0041056 A1 * | 4/2002 | Nissel ........................ 264/409 |
| 2002/0070478 A1 * | 6/2002 | Nissel .................... 264/211.12 |

FOREIGN PATENT DOCUMENTS

DE  25 03 130 A1  7/1976

* cited by examiner

*Primary Examiner*—Mark Eashoo
(74) *Attorney, Agent, or Firm*—Schnader Harrison Segal & Lewis LLP

(57) ABSTRACT

Heating and extruding a polymeric sheet having a predetermined thickness and introducing it into and through a gap between cooling rolls, measuring directly by laser beam and without reflection the gap between the cooling rolls, and controlling the gap to control minimal pressure on the softened and heat-plastified sheet.

11 Claims, 5 Drawing Sheets

FIG. 3
ELEVATION
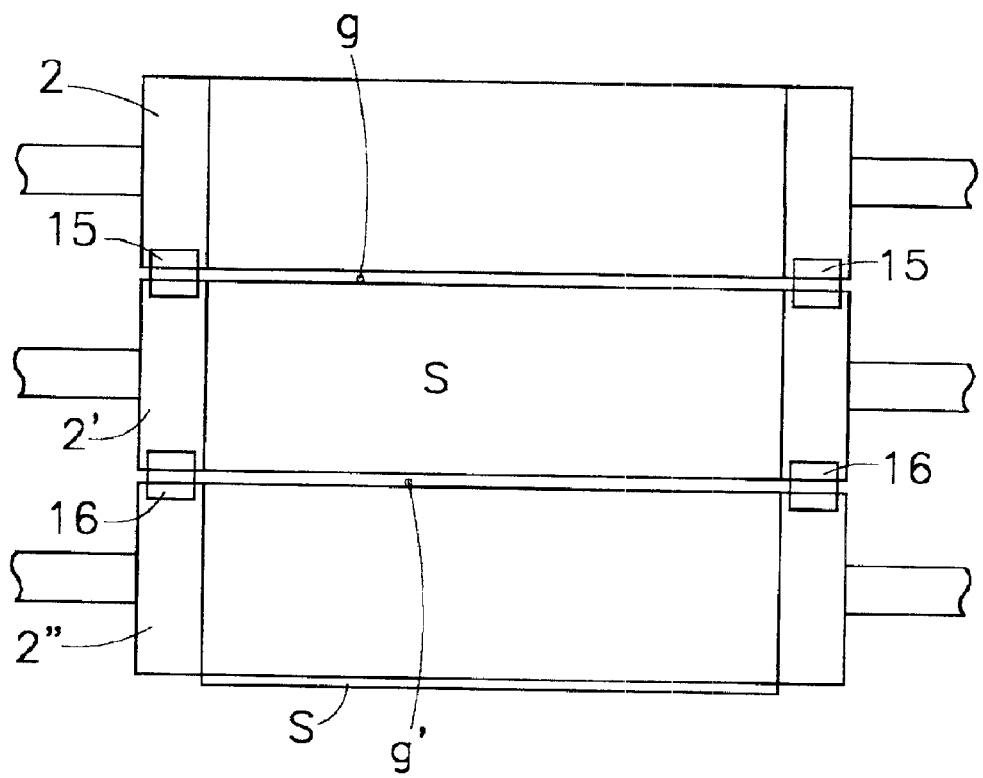
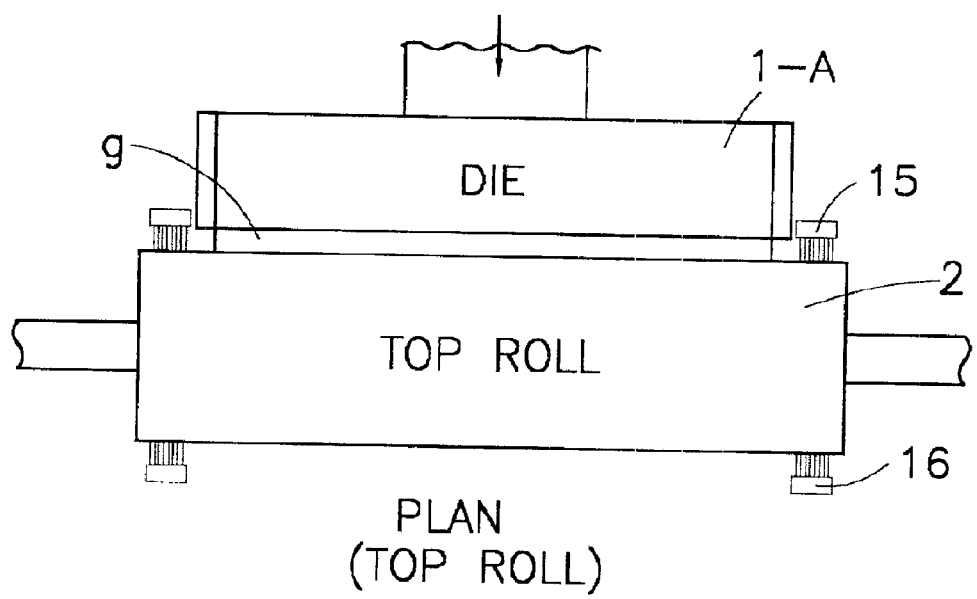
PLAN
(TOP ROLL)
FIG. 4

ROLL CROSS SECTION

APPARATUS AND METHOD FOR MEASURING AND OF CONTROLLING THE GAP BETWEEN POLYMER SHEET COOLING ROLLS

This application is a continuation in part of application Ser. No. 09/422,483, filed Oct. 21, 1999, now U.S. Pat. No 6,406,285.

FIELD OF THE INVENTION

This invention relates to apparatus and method for accurately and uniformly cooling a preformed polymeric sheet. It further relates to apparatus and method for extruding and cooling a preformed polymeric sheet wherein the gap between adjacent rolls is measured and controlled for accurately and gently cooling the polymeric sheet with minimum stress.

DESCRIPTION OF THE RELATED ART

Polymeric extruded or coextruded sheets are usually extruded out of a slit die of appropriate width, as indicated in the U.S. Patents to Frank R. Nissel U.S. Pat. Nos. 3,918,865, 3,940,221, 3,959,431, 4,533,510 and 5,466,403, for example. The hot sheet is then cooled by passing it through a pair or a series of temperature-controlled rolls. Although various roll numbers and arrangements may be used, three rolls are often used, sometimes in planar alignment with each other. The gaps between the rolls are desired to be precisely adjusted according to the desired final sheet thickness. This precision is necessary for a variety of reasons, including elimination of air entrapment between the rolls, which causes adverse or uneven heat transfer or cooling. The rolls typically apply embossing to provide a high quality surface impression on the sheet. If the roll opening is too small, material being processed will accumulate and form a bank, which will cause surface defects and stresses in the sheet if it becomes excessive or cooling and surface defects.

Traditionally, the sheet die exit is horizontal and the sheet runs through a cooling roll stack at any angle, either upwardly or downwardly. Vertical, horizontal or various angled roll stacks may be used.

For various purposes, the art has made efforts from time to time to measure the gap distance between cooling rolls. Gauging the gap distance has been achieved mechanically through the use of feeler gauges. Unfortunately, feeler gauges lack the precision needed for maintaining optimal cooling and surface impression. They provide only a go/no go type reading without giving accurate quantitative measurements. They further tend to scratch the roll surfaces. Feeler gauges also pose the danger of being accidentally drawn into the rolls and permanently damaging them. Also, feeler gauges do not lend themselves to any automatic control system.

To avoid these dangers, methods have been introduced where indirect measurement of the gap is taken. This includes measuring the sheet material which passes between the rolls, measuring the distance between the mounting blocks used to support the rolls, and measuring reduced diameter barrel portions. These methods, however, do not and cannot account for actual differences in the diameter of the roll, caused by changes in temperature and other factors. An accurate way to measure the gap between the rolls would be to measure the gap directly, but the reported attempts have not succeeded.

Several devices which monitor a sheet are used to influence the thickness of the sheet product. For example, U.S. Pat. No. 3,809,907 which issued to Schuller et al on May 7, 1974, discloses a device for controlling a bank of viscous material that is formed on, and builds up in front of, the nip of a pair of spaced rolls. Specifically, the rolls are first maintained in close proximity such that the molten material applied to an entry side of the rolls forms a bank of hot material against and before passing through the rolls. The amount of molten material accumulation is measured by a pair of laser emitters and detectors, located at or near the ends of the rolls. But the laser measures the amount of molten steel that is banked up before it flows between the rolls, not the actual roll gap.

Turning now to the field of plastic sheets, extrusion dies with variable lip portions have been used to form polymeric sheets of varying widths and thickness. Once extruded through an adjustable lip die, the polymeric sheet is substantially at its desired thickness. However, there is a demand for cooling of a preformed polymeric sheet without excessively stressing the polymeric sheet product.

There is a need to provide an apparatus for extruding polymeric sheet materials with an extrusion die capable of pre-forming polymeric sheets of accurately predetermined thickness, and a cooling device having cooling rolls defining a gap of precisely known dimension through which the polymeric sheet passes for the purpose of cooling or embossing, wherein the rolls rapidly and uniformly cool the polymer while exerting only minimal pressure on the extruded sheet.

SUMMARY OF THE INVENTION

This invention includes an extruder and cooling rolls that have an adjustable gap through which a preformed polymeric sheet passes. The gap between the rolls is accurately measured and controlled to allow the rolls to exert only a minimal pressure on the polymeric sheet and to impart the best surface finish to the sheet while subjecting it to the lowest possible stress level.

BRIEF DESCRIPTION OF THE DRAWINGS

FIG. 3 is a view in end elevation of the cooling rolls 2, 2' and 2" which appear in FIG. 2.

FIG. 4 is a plan view of the die 1-A and the top roll 2 which appear in FIG. 1,

DETAILED DESCRIPTION OF THE PREFERRED EMBODIMENT

Although the present invention will be hereinafter described in regard to specific embodiments thereof, these embodiments are provided merely for illustration. This invention is not limited to the specific details; its scope is defined in the appended claims.

Figure 1:
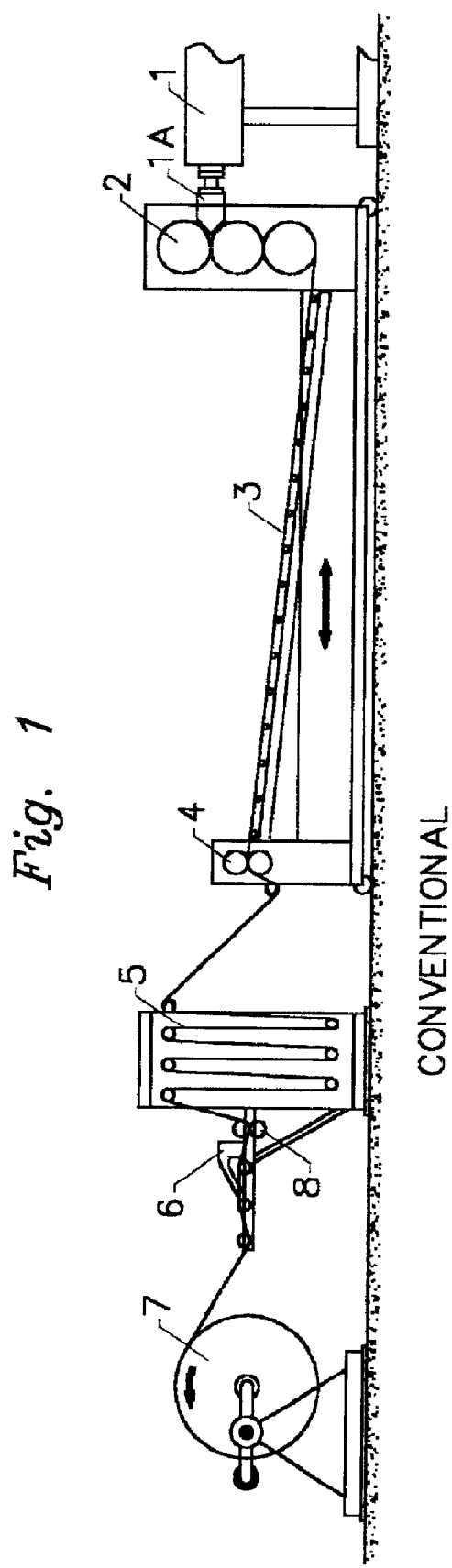
FIG. 1 shows a conventional plastic sheet extrusion line used for high speed production of sheet in rolls.

Turning now to FIG. 1 of the drawings, showing a conventional sheet extrusion line, the number 1 is a conventional extruder that plasticizes and pumps the plastic material to die 1A that extrudes a sheet of finite width. 2 is a three roll sheet take-off also known colloquially as a calendar. It serves to cool the extruded sheet back to near room temperature. These three rolls are driven by a variable speed motor. 3 (in FIG. 1) is an idler roll conveyor positioned to support the sheet while being finally cooled by ambient air. 4 is a set of pull rolls provided to maintain tension on the sheet going over the conveyor 3. These pull rolls are driven by a second variable speed motor.

5 is a roll winder producing rolls from the pull rolls 4 of finite length. An indexing two-position turret winder is shown because of its convenience, but any other single or multiple type of roll winder can be used. Sheet could also be cut-to-length or run directly into another process such as a thermoforming machine, for example.

Cooling and surface imprinting can be accomplished simultaneously using cooling rolls. The polymeric sheet is hot enough or warm enough to be susceptible to damage and deformation if not handled gently. For this reason, the sheet should be introduced to the cooling rolls promptly after leaving the die.

The rolls of the cooling roll stacks are generally made up of a plurality of cooling rolls, turning parallel on axes of rotation. In some cases three or more cooling rolls are used, as shown for example in FIG. 2. Each roll is designed to be a heat sink for transferring heat from the polymeric sheet during the cooling process, without changing the symmetry and thickness of the sheet. Some or each of the cooling rolls may also be provided with an embossing platen surface, which is also subject to the dangers earlier discussed.

Between at least two adjacent rolls, a gap is defined. Two such gaps are shown at "g" and "g'" in FIGS. 2, 3 and 4. Each gap performs a vital role in the production cooling of high quality polymeric sheets.

In accordance with this invention each gap "g" is precisely maintained at a desired uniform distance from roll edge to roll edge, whereby the sheet has a width less than the width of the rolls. A laser light emitter 15 is provided at the upstream or downstream side of each roll gap, and aimed with its beam projecting through each gap "g." A laser beam detector 16 is provided on the opposite side of each gap "g" for measuring the amount or extent of light passing through the gap. In each case the laser light passes through the roll gap itself outside the area covered by the sheet S, see also FIGS. 3 and 4. There is a laser on each edge of each roll, a total of four in FIGS. 2, 3 and 4. A sensor such as a computer or other device (not shown) is provided for comparing the measured light that passes through each gap to a control value corresponding to a gap distance. The comparing means may be further connected to a means for controlling the linear displacement of the rolls with respect to each other to achieve an accurately maintained gap between the rolls, and to report the measured value to the operator.

Each laser is preferably aimed so the laser light hits both roll surfaces 2, 2' and 2", and a portion of the laser light passes between the rolls and through the gap. This ensures accurate direct and non-reflective light measurement of the thickness of the gap itself.

This measurement system may be used continuously throughout the extrusion cooling process. The gap distance maybe adjusted when necessary, either manually or automatically in view of a laser measurement if desired, thereby maintaining the desired gap distance without damaging or reducing the thickness of the delicate polymeric sheet. Importantly, this allows for real-time adjustment due to fluctuations in the roll diameter caused by temperature fluctuations and other factors.

The rolls are preferably specifically and precisely set not to exert enough pressure to damage or to change substantially the thickness of the polymeric sheet. Preferably, the rolls are adjusted from time to time or continuously to maintain a gap which is preset to maintain precise contact with the polymeric sheet for cooling or also for imprinting the sheet surface with the desired pattern.

It is important to control the roll gap to a preset or precisely known dimension to impart the best surface finish to the sheet while developing the lowest possible stress level.

Figure 2:
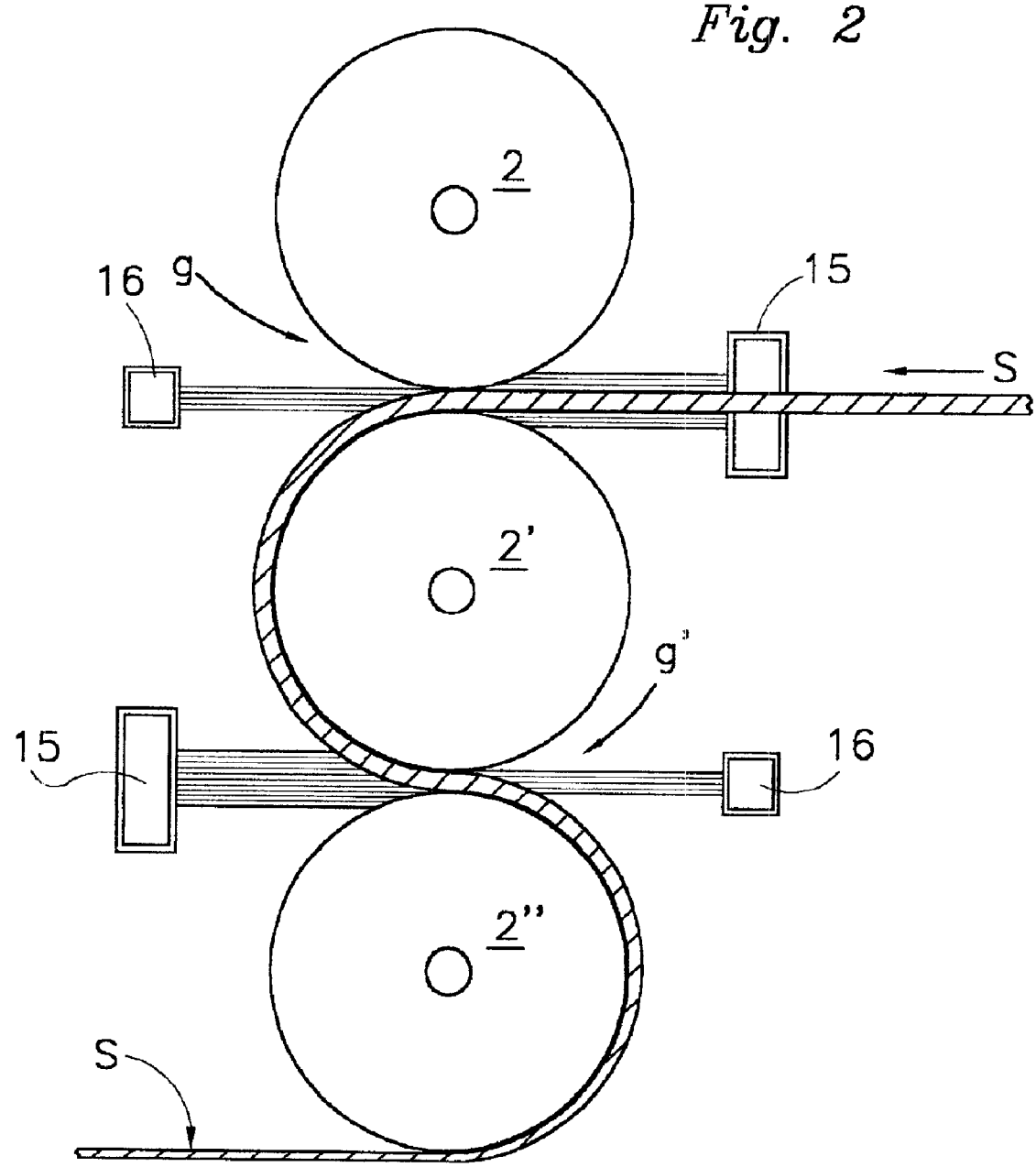
FIG. 2 is an end view, as seen through a center section of the cooling roll assembly, of a three-roll stack of polymer sheet cooling rolls arranged for direct roll gap measurement in accordance with this invention.

The polymer cooling roll arrangement of FIGS. 2 and 4 may be used in cooling roll stacks having vertical, horizontal, or angular or other orientations. Preferably, a roll stack will often have three rolls arranged such that their axes of rotation are coplanar. However, many different combinations or arrangements may be used.

When the polymeric sheet leaves the cooling stack, it has been cooled sufficiently to its final form, and embossed if desired. Subsequently, it is introduced to a takeup spool 5 (FIG. 1), where it is rolled for storage or delivery.

The method of treatment of the sheet according to this invention includes the step of extruding the polymeric sheet to substantially its final thickness and then introducing it into and through the controlled dimension gaps between the cooling rolls. The controlled gap dimension is of primary importance and control. The roll pressure may vary between about 20 to 1000 pounds per linear inch of roll width. In many cases the roll pressure is preferably applied to keep the rolls in a predetermined position against the sheet pressure.

In a preferred form the gaps between each two adjacent rollers are automatically and continuously monitored by the laser gap monitor and continuously or periodically adjusted to a predetermined roll gap.

As described, the gap distance is desirably first measured by projecting a laser at and through the gap and directly without reflection to a beam detector or photosensor on the opposite side of the gap. A comparator connected to the detector then compares the received signal to a control signal which may or may not correspond to a desired gap distance. The comparator then communicates the results to a computer for linear adjustment of the rolls defining the gap distance. One or more rolls is then adjusted linearly, accordingly. This process is continued preferably throughout the polymer extrusion process, and therefore maintains exacting standards on the polymeric sheet thickness.

Knowledge by the operator of strictly controlled gap distances is critical to the consistent production of quality polymeric sheet material. If the roll gap is too large, or irregular in size or shape, air is occluded between the roll surface and the sheet, resulting in poor or uneven cooling and poor surface finish. On the other hand, if the roll gap is too small, the incoming material cannot pass uniformly completely through the gap and this results in accumulation of a bank of polymeric material, causing unacceptable surface imperfections and stress in the sheet and other defects. An insufficient roll gap also creates added pressure on the polymeric sheet, and may undesirably effect the thickness of even a sheet which has earlier been accurately formed to its proper and accurate specifications by the extrusion die.

In accordance with this invention the laser operates without roll reflection. Since the light passes through the tangential point of two rolls, there is no possibility of reflected light. In any case, the detector is opposite the light source from the rolls so that any reflection would not be detected.

The rolls are usually held closed against an adjustable fixed stop or by a positioning device; otherwise the rolls could float against the sheet, in which case automatic control would be difficult. The rolls are usually held closed by an adjustable pneumatic or hydraulic pressure system so that they can open up in case of extreme material pressure to avoid damage to the rolls. In some cases the rolls are held by screw devices instead, still allowing accurate and adjustable roll opening control.

The ability to maintain a precisely preset roll gap is most desirable to produce uniform stress free sheet. Direct roll gap measurement according to this invention is the only reliable means of achieving this.

As is shown in FIGS. 3 and 4 the sheet 5 has a width that is less than the width of the rolls 2, 2' and 2", leaving gaps that are free of polymeric material, as previously described herein. This allows the laser beams to pass through the roll grap itself outside the area covered by the sheet S, see also FIGS. 3 and 4.

In practice the selection of roll width can be accomplished by determining the sheet width requirement, then building the die somewhat wider to allow for possible necking down due to shrinkage of the sheet, with loss of width between the die 1-A and the rolls 2, 2' and 2" due to the elasticity of the polymer. The roll width of rolls 2, 2' and 2" are generally selected so that the outer 2" to 3" are not contacted by the sheet. This provides better and more uniform cooling because, in a typical cooling roll such as the one shown in FIG. 5, the end plates 30, 30 prevent circulation of cooling water beyond the spiral cooling water baffles 31 and the passage of water cannot be used to provide accurately controlled cooling at the extreme ends of the cooling roll 2. This further emphasizes the merit of providing open edges which can be sighted through by the laser beams.

Figure 5:
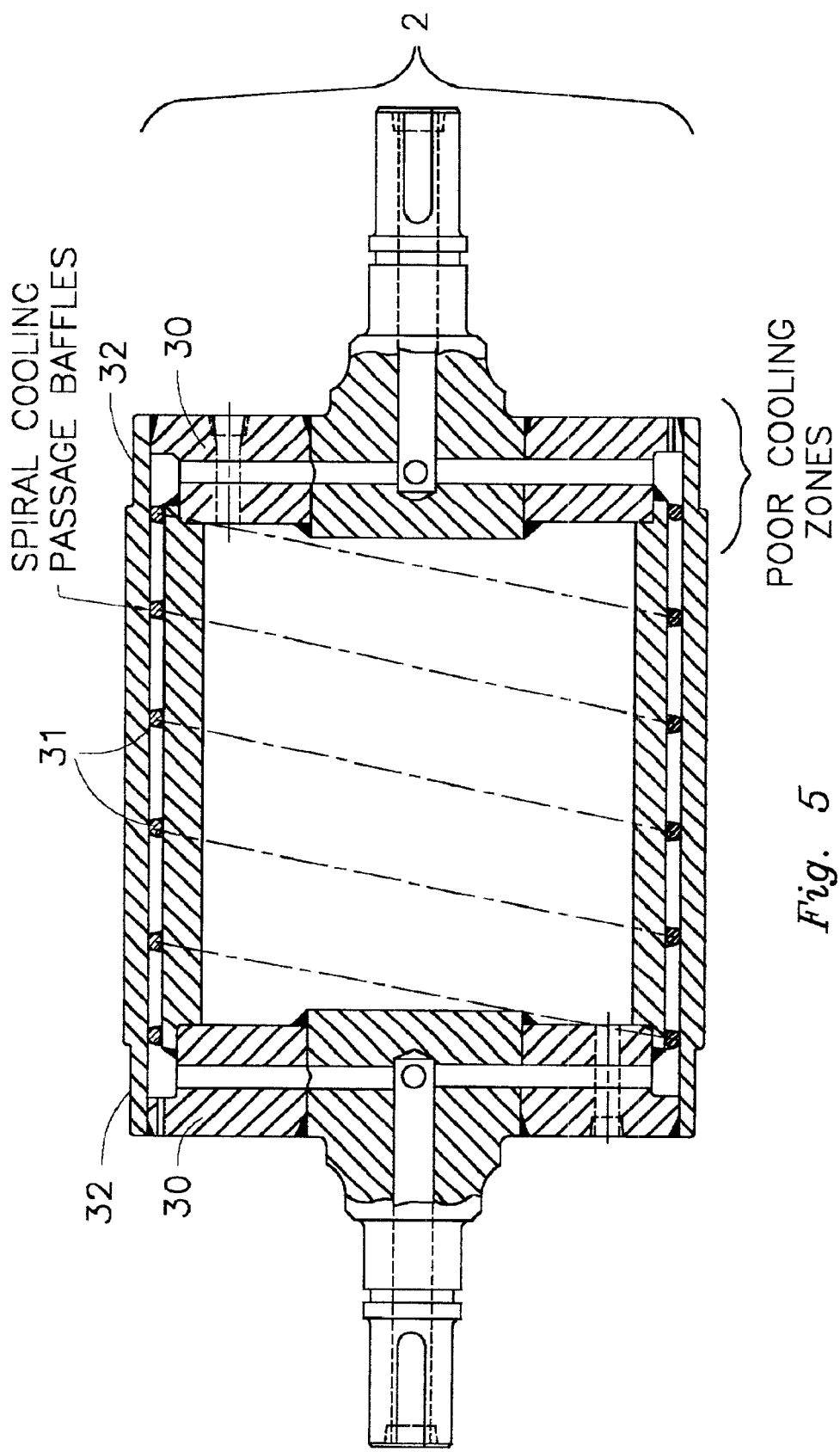
FIG. 5 is a sectional view showing a typical cooling roll internal construction.
Figure 6:
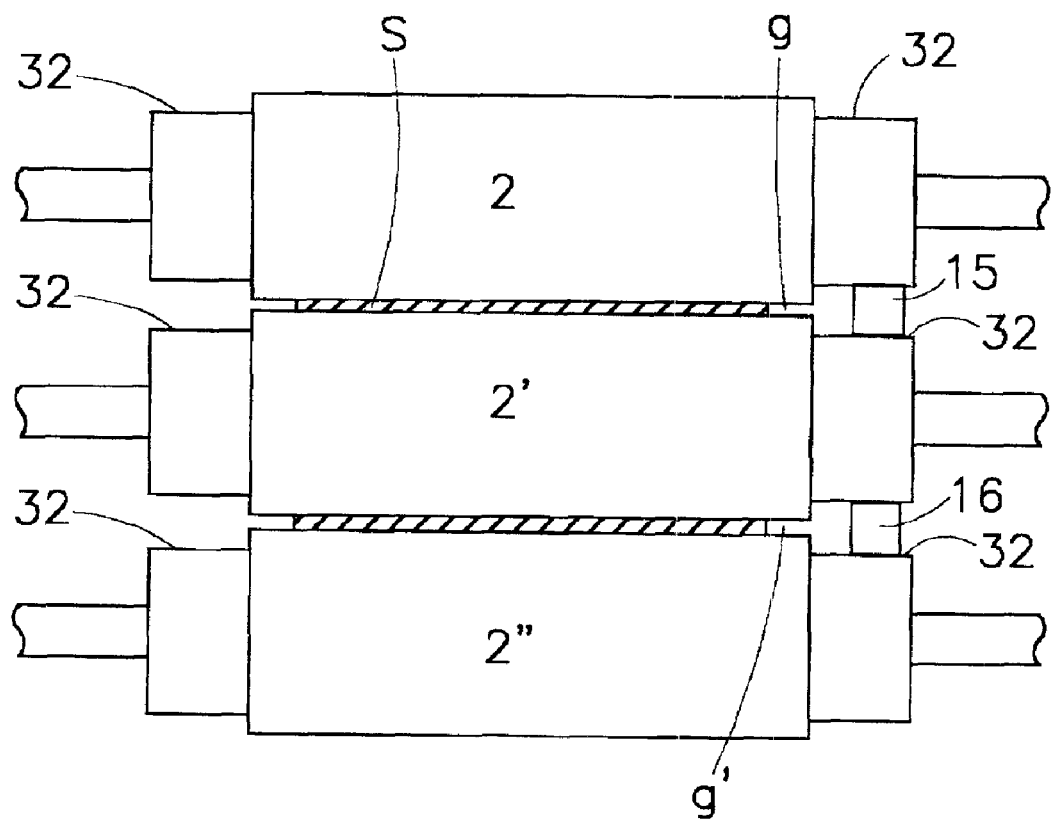
FIG. 6 is an end view, with the sheet S in section, of a modified set of cooling rolls.

The end portions of the cooling rolls 2, 2' or 2" can even be undercut to increase the sizes of the aforementioned end openings, as shown in FIG. 5 of the drawings, the undercut portions being marked 32. All of the cooling rolls can be undercut, as shown in FIG. 6, or the middle roll 2' can be the only one undercut, or many other variations may be enjoyed, so long as room will always be provided at the roll ends to sight through with the laser devices 15, 16 shown in FIG. 6.

What is claimed is:

1. An apparatus for extruding and cooling polymeric sheet materials, said apparatus comprising:
    a polymer sheet extruder producing polymeric sheets of predetermined thickness;
    a plurality of cooling rolls positioned downstream of a heating device, a gap between said cooling rolls being position in concert with said extruder for introducing said sheet into said gap, each said cooling roll having a longitudinal axis of rotation and being capable of cooling a polymeric sheet produced by said extruder;
    a positioning device connected to at least one of said rolls, said positioning device being mounted for selective positioning with respect to another of said cooling rolls;
    a laser source connected for measuring directly and without reflection, and while said sheet is processed through said gap, the thickness of said gap, said laser source being aimed in said machine direction and emitting a laser beam aimed and arranged for transmitting a beam of laser light into and directly through said gap;
    a corresponding laser beam detector positioned and aimed in line with said gap on a side of said cooling rolls opposite to said laser source for non-reflectively measuring, while said sheet is processed through said gap, the amount of laser light passing directly through said gap;
    a measuring and comparison device for comparing said measured value to a desired value corresponding to a desired gap width; and
    a controller responsive to said measured value for controlling said gap distance through selective linear roll displacement;
    wherein at least one of said cooling rolls has at least one end portion with a diameter less than the diameter of the roll portion having said extruded sheets thereon to provide space through which said laser beam can be sighted.

2. The apparatus of claim 1 wherein said smaller diameter end portion is a separate component affixed to said roll.

3. The apparatus of claim 1 wherein a plurality of gaps are present, each with a laser source and a laser detector, and wherein each said laser source emits a laser beam, and its corresponding laser source and its corresponding laser detector are located at opposite sides of said gap between said adjacent rolls.

4. The apparatus of claim 1 comprising three cooling rolls arranged in a stack.

5. The apparatus of claim 4 wherein said cooling rolls are arranged in a stack which is oriented in a vertical orientation.

6. The apparatus of claim 4, wherein said rolls are arranged in a cooling stack which is oriented in a horizontal position.

7. The apparatus of claim 4, wherein said rolls are arranged in a cooling stack which is angled between a horizontal and a vertical orientation.

8. The apparatus of claim 7 wherein only the middle of the three cooling rolls has one or more smaller diameter end portions.

9. The apparatus of claim 7, wherein said laser source and said corresponding laser detector are positioned adjacent two adjacent cooling rolls, and oriented physically to measure directly said gap therebetween.

10. The apparatus of claim 1 wherein the positioning device comprises a pneumatic pressure system.

11. The apparatus of claim 1 wherein the positioning device comprises a hydraulic pressure system.

* * * * *